(12) United States Patent
Wei et al.

(10) Patent No.: US 9,065,782 B2
(45) Date of Patent: Jun. 23, 2015

(54) METHOD AND APPARATUS FOR CONTROLLING INFORMATION ELEMENT SWITCH

(75) Inventors: Xingzi Wei, Shenzhen (CN); Jian Xu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 149 days.

(21) Appl. No.: 13/809,967

(22) PCT Filed: May 17, 2011

(86) PCT No.: PCT/CN2011/074192
§ 371 (c)(1),
(2), (4) Date: Jan. 14, 2013

(87) PCT Pub. No.: WO2012/010007
PCT Pub. Date: Jan. 26, 2012

(65) Prior Publication Data
US 2013/0114604 A1    May 9, 2013

(30) Foreign Application Priority Data

Jul. 20, 2010  (CN) .......................... 2010 1 0233913

(51) Int. Cl.
*H04L 12/911* (2013.01)
*H04L 12/933* (2013.01)

(52) U.S. Cl.
CPC .............. *H04L 47/821* (2013.01); *H04L 49/15* (2013.01)

(58) Field of Classification Search
CPC .............. H04J 2203/0048; H04J 3/085; H04J 2203/0082; H04L 12/5602; H04L 29/06; H04L 29/0653; H04L 41/08; H04L 45/00; H04L 47/10; H04L 49/15; H04L 49/20; H04L 49/30; H04L 49/45; H04L 49/65; H04L 49/105; H04L 49/206; H04L 49/503; H04L 49/506; H04L 49/552; H04L 49/3009; H04L 49/3081; H04L 2012/5635; H04L 2012/5636; H04L 2012/5681; H04L 12/5601; H04L 12/5693; H04L 47/27; H04L 47/30; H04L 47/32; H04L 47/2441; H04L 49/25; H04L 49/90; H04L 49/101; H04L 49/254; H04L 49/351; H04Q 2213/1329; H04Q 2213/13103; H04Q 11/04; H04Q 11/0407; H04Q 11/0478; H04Q 2213/1304
USPC .............. 370/231, 236, 236.1, 357, 359, 392, 370/413, 235, 355, 360, 386, 419; 713/1
See application file for complete search history.

(56) References Cited

U.S. PATENT DOCUMENTS

| 4,621,358 | A  | * | 11/1986 | Jotwani ......................... 370/359 |
| 6,816,492 | B1 | * | 11/2004 | Turner et al. .................. 370/394 |
| 2007/0166035 | A1 | * | 7/2007 | Aoki ............................... 398/51 |

FOREIGN PATENT DOCUMENTS

| CN | 1213444 A | 4/1999 |
| WO | WO 2004/093407 | 10/2004 |
| WO | WO 2008/084392 | 7/2008 |

OTHER PUBLICATIONS

International Search Report for International Application No. PCT/CN2011/074192 mailed Aug. 25, 2011.

*Primary Examiner* — Alpus H Hsu
*Assistant Examiner* — Dharmesh Patel
(74) *Attorney, Agent, or Firm* — Pearl Cohen Zedek Latzer Baratz LLP

(57) ABSTRACT

The disclosure discloses a method and apparatus for controlling information element switch. The method comprises the following steps: a switch board determines that it has received a link request information element from each ingress line card, wherein the link request information element carries the request time stamp information; the switch board performs link allocation according to each request time stamp information, wherein the link is the link connecting the switch board with each egress line card; and each ingress line card transmits a data information element according to the result of the link allocation. With the disclosure, the problems of time delay and jitter in an information element switch process are solved, the input end flow of the switch board can also be controlled, and the requirement for the egress line card cache and difficulty in data packet recombination are reduced.

7 Claims, 6 Drawing Sheets

| Type field | Ingress line card identity field | Request field | Time stamp information field |
|---|---|---|---|
|  |  |  |  |

METHOD AND APPARATUS FOR CONTROLLING INFORMATION ELEMENT SWITCH

CROSS-REFERENCE TO RELATED APPLICATIONS

This application is a National Phase Application of PCT International Application No. PCT/CN2011/074192, International Filing Date May 17, 2011, claiming priority of Chinese Patent Application No. 201010233913.X, filed Jul. 20, 2010, which is hereby incorporated by reference.

FIELD OF THE INVENTION

The disclosure relates to the communication field, and in particular to a method and apparatus for controlling information element switch.

BACKGROUND OF THE INVENTION

FIG. 1 shows a fundamental structure diagram of a switch network, comprising two parts, a line card and a switch board, wherein the line card comprises: an ingress line card and an egress line card.

In order to meet the requirement of switch control, the related high-speed router usually adopts the length-fixed information element switch mechanism, such as, dividing an arrived IP message into multiple information elements with fixed length. In the switch board, the information element can reach the egress line card through multiple paths. The time delays of different paths are different, which causes that multiple information elements belonging to one data packet reach the egress line card disorderly.

In addition, under the condition that multiple ingress line cards transmit data to one egress line card, the information elements of different data packets interleave. This requires very large cache in the egress line card to store these information elements. After all information elements of the data packet are received, these information elements are recombined into a data packet and then are transmitted out. Thus, the operation process is extraordinarily complex, and it is difficult to meet the requirements of resource and performance. And, it will cause a relatively large time delay when multiple ingress line cards transmit data to one egress line card at the same time. As shown in FIG. 2, supposing that N ingress line cards transmit data packets to the egress line card #k at the same time, and most of the information elements of each data packet have reached the egress line card #k and they are waiting for arrival of their last information element, then the following three results are produced: the egress line card #k needs a very large cache; the complexity of data packet recombination is high; and the time delay of the last recombined data packet will be the accumulation of the time delays of previous N−1 data packets, and the time delay jitter is very large.

For reducing the difficulty of data packet recombination, the relevant technologies adopt the information element order preserving technology. This technology uses a cache with relatively large capacity at the output port of the switch board to reorder these information elements, that is, controlling the order of transmitting the information elements at the output port of the switch board. As shown in FIG. 3, after the switch board adopts the information element order preserving technology, the information elements belonging to the same data packet reach the egress line card in order, thereby solving the disorder problem when the information elements with fixed length pass the switch board.

The inventors find that the information element order preserving technology reduces the cache of the egress line card to some extent, but increases the cache of the switch board. In addition, the switch board needs to reorder the information elements, and the egress line card still needs to wait for a long time for the completion of the recombination and transmission of the whole data packet, thereby causing the problems of large time delay and jitter in the information element switch process.

SUMMARY OF THE INVENTION

The disclosure mainly provides a method and apparatus for controlling information element switch, so as to solve the problems of large time delay and jitter in the information element switch process.

According to an aspect of the disclosure, a method for controlling information element switch is provided, comprising: a switch board determining that a link request information element from each ingress line card is received, wherein the link request information element carries request time stamp information; the switch board performing link allocation according to each request time stamp information, wherein the link is a link connecting the switch board with each egress line card; and the each ingress line card transmitting a data information element according to a result of the link allocation.

Further, the link request information element also carries an egress line card identity; and the switch board performing link allocation according to the each request time stamp information comprises: the switch board extracting the request time stamp information from each link request information element, comparing size of the each request time stamp information, and selecting an ingress line card with minimum request time stamp information as a first line card waiting for allocation; and the switch board determining whether an egress line card to which the egress line card identity corresponds is in an idle state, and if yes, allocating a link to which the egress line card identity corresponds to the first line card waiting for allocation.

The link request information element also carries address information of the ingress line card; and after comparing the size of the each request time stamp information, the method further comprises: when multiple values of the each request time stamp information are the same, and the multiple values are less than other request time stamp information except the multiple values, selecting one ingress line card as the first line card waiting for allocation from ingress line cards to which the multiple values correspond, according to the address information of the ingress line card.

After the switch board determining whether the egress line card to which the egress line card identity corresponds is in the idle state, the method further comprises: if a result of determining by the switch board is no, determining that the egress line card to which the egress line card identity corresponds is in an allocated state, and the switch board notifying the first line card waiting for allocation to re-request for link.

Further, both the link request information element and the data information element carry a type identity; and before the switch board determining that the link request information element from the each ingress line card is received, the method further comprises: the switch board determining the type of the received information element according to the type identity; and if the information element is the data information element, the switch board forwarding the data information element to corresponding egress line card.

After the switch board performing the link allocation according to the each request time stamp information, the method further comprises: changing the state of the egress line card of the allocated link to an allocated state; and after the each ingress line card transmitting the data information element according to the result of the link allocation, the method further comprises: notifying the switch board to release a corresponding link; and after receiving the notification, the switch board changing the state of the egress line card of the corresponding link to an idle state.

According to another aspect of the disclosure, an apparatus for controlling information element switch is provided, which comprises an ingress line card, a switch board and an egress line card, wherein the ingress line card comprises: a time stamp marking and transmitting module, configured to transmit a link request information element to the switch board, wherein the link request information element carries request time stamp information; a data information element transmitting module, configured to transmit a data information element according to a result of link allocation of the switch board; and the switch board, configured to receive the link request information element from each ingress line card and to perform the link allocation according to each request time stamp information, wherein the link is a link connecting the switch board with each egress line card.

The switch board further comprises: a time stamp information extracting module, configured to extract the request time stamp information from each received link request information element; a time stamp comparing module, configured to compare size of each request time stamp information extracted by the time stamp information extracting module, and to select an ingress line card with minimum request time stamp information as a first line card waiting for allocation; and a link allocating module, configured to determine whether an egress line card to which an egress line card identity corresponds is in an idle state according to the egress line card identity carried in the link request information element of the first line card waiting for allocation, and if yes, to allocate a link to which the egress line card identity corresponds to the first line card waiting for allocation.

The time stamp comparing module further comprises: a line card selecting unit, configured to, when multiple values in the request time stamp information of the each ingress line card are the same, and the multiple values are less than other request time stamp information except the multiple values, select one ingress line card as the first line card waiting for allocation from ingress line cards to which the multiple request time stamp information values correspond according to address information of the ingress line card carried in the link request information element.

The switch board further comprises: an information element separating module, configured to, after receiving an information element carrying a type identity, if it is determined that the received information element is the link request information element according to the type identity, transmit the link request information element to the time stamp information extracting module, and if it is determined that the received information element is the data information element according to the type identity, transmit the data information element to a data information element processing module; and the data information element processing module, configured to forward the data information element to corresponding egress line card.

With the disclosure, the switch board performs link allocation according to each request time stamp information, and each ingress line card transmits the data information element according to the result of the link allocation. Thereby, this solution solves the problems of time delay and jitter in the information element switch process, controls the traffic of the input end of the switch board, and reduces the requirement for the egress line card cache and the difficulty in data packet recombination.

BRIEF DESCRIPTION OF THE DRAWINGS

The drawings described herein are provided for a further understanding of the disclosure, and constitute a part of the application. The schematic embodiments of the disclosure and the description thereof are used for illustrating the disclosure and are not intended to form improper limit to the disclosure. In the drawings.

DETAILED DESCRIPTION OF THE EMBODIMENTS

The disclosure is described hereinafter in detail with reference to the drawings and embodiments. It should be noted that the embodiments and features in the embodiments of the application can be combined with each other if there is no conflict.

The switch network of the embodiments of the disclosure comprises an ingress line card, a switch board and an egress line card. Each ingress line card is configured with a timer with the same time base. The following embodiments are described by taking the case of implementation on this switch network as an example.

Embodiment 1

Figure 4:
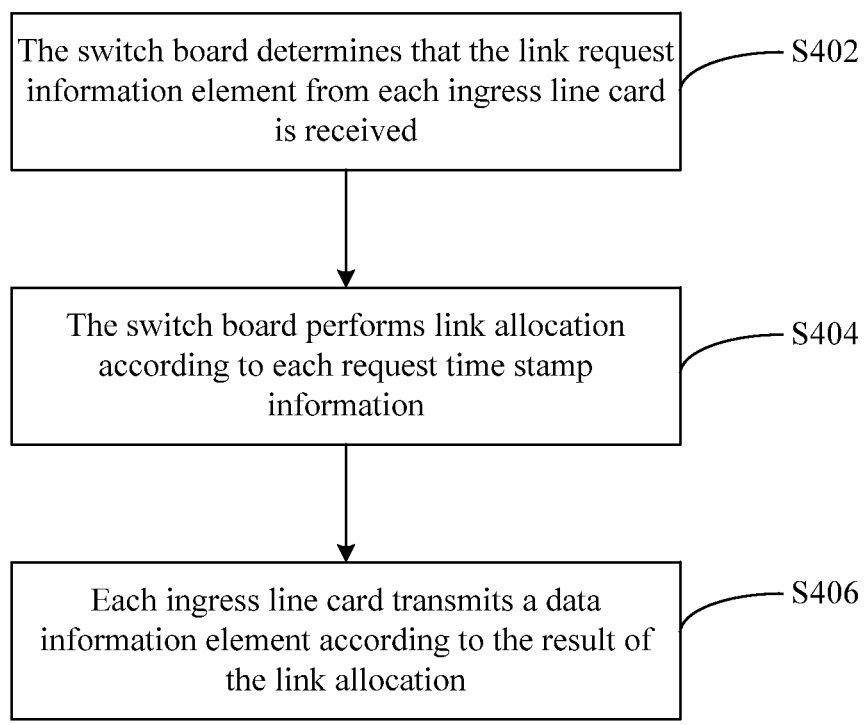
FIG. 4 shows a flowchart of a method for controlling information element switch according to embodiment 1 of the disclosure.

FIG. 4 shows a flowchart of a method for controlling information element switch according to embodiment of the disclosure. The method comprises the following steps.

Step S402: the switch board determines that the link request information element from each ingress line card is received, wherein the link request information element carries the request time stamp information.

The ingress line card marks the request time stamp information for the link request information element according to the established rules. For example, all the ingress line cards use the timers with the same time base to mark the request time stamp information for the link request information element, wherein the request time stamp information of the embodiment is the current time stamp of the ingress line card. When the ingress line card has data to be transmitted, the link request information element is transmitted, and the current time stamp is carried in the link request information element.

Step S404: the switch board performs link allocation according to each request time stamp information, wherein the link is a link connecting the switch board with each egress line card.

The request time stamp information of the embodiment marks the time when the ingress line card requests for link. When performing link allocation, the switch board can preferentially allocate the available link to the ingress line card which applied for a link early, and then allocate other available links for the ingress line card which applied for a link later. Thereby, this solution achieves the effect of transmitting data packet in the peak load shifting way on the ingress line card.

Step S406: each ingress line card transmits the data information element according to the result of the link allocation.

After completing link allocation, the switch board notifies the ingress line card of the specific condition of the allocation. Then, the ingress line card transmits the data information element according to the notification.

The switch board of the embodiment performs link allocation according to each request time stamp information, and each ingress line card transmits the data information element according to the result of the link allocation. Thereby this solution solves the problems of time delay and jitter in the information element switch process, controls the flow of the input end of the switch board, and reduces the requirement for the egress line card cache and the difficulty in data packet recombination.

Preferably, the link request information element also carries the egress line card identity. And Step S404 comprises that: the switch board extracts the request time stamp information from each link request information element, compares the size of the request time stamp information, and selects the ingress line card with the minimum request time stamp information as the first line card waiting for allocation; and the switch board determines whether the egress line card to which the egress line card identity (carried in the link request information element transmitted by the first line card waiting for allocation) corresponds is in the idle state, and if yes, allocates the link to which the egress line card identity corresponds to the first line card waiting for allocation.

In practical implementation, each ingress line card can transmit the link request information element in real time. If the ingress line card does not have data to be transmitted at present, the transmitted link request information element does not have to carry the egress line card identity information. If there is data to be transmitted, the transmitted link request information element carries the egress line card identity information.

For differentiating the link request information elements with the same time stamp, the link request information element of the embodiment also carriers the address information of the ingress line card. When multiple request time stamp information values of the each request time stamp information are the same, and the multiple request time stamp information values are less than other request time stamp information except themselves, one ingress line card from the ingress line cards to which the multiple request time stamp information values correspond is selected as the first line card waiting for allocation, according to the address information of the ingress line card. For example, an ingress line card with the minimum address can be selected from the multiple ingress line cards with the same request time stamp information as the first line card waiting for allocation. Or, an ingress line card with the maximum address can be selected from the multiple ingress line cards with the same request time stamp information as the first line card waiting for allocation. Given the simplicity of implementation, the ingress line card with the minimum address is usually selected as the first line card waiting for allocation.

After determining whether the egress line card to which the egress line card identity corresponds is in the idle state, if the result of determining is that the egress line card is in allocated state, the switch board notifies the first line card waiting for allocation to re-request for link.

The ingress line card of the embodiment transmits the link request information element as well as the data information element. Therefore, for enabling the switch board to determine the specific type of the received information element easily, no matter what type of the information element the ingress line card transmits, the information element always carries the type identity. For example, both the link request information element and the data information element carry the type identity. The switch board determines the type of the received information element according to the type identity. If the information element is the link request information element, Step S402 to Step S406 are executed. If the information element is the data information element, the switch board forwards the data information element to the corresponding egress line card.

The egress line card of the embodiment has two states; one is the idle state, and the other is the allocated state. Both of the two states are stored on the switch board, and the switch board will update the state of each egress line card in real time, according to the condition of link allocation. For example, after performing link allocation according to each request time stamp information, the switch board changes the state of the egress line card of the allocated link to the allocated state.

After transmitting the data information element according to the result of the link allocation, each ingress line card notifies the switch board to release the corresponding link. After receiving the notification, the switch board changes the state of the egress line card of the corresponding link to the idle state.

The switch board of the embodiment performs link allocation according to each request time stamp information, and each ingress line card transmits the data information element according to the result of the link allocation. This solution can implement centralized scheduling to the distributed switch network, thereby solving the problems of time delay and jitter in the information element switch process, controlling the flow of the input end of the switch board, and reducing the requirement for the egress line card cache and the difficulty in data packet recombination.

Embodiment 2

Figures 5, 6:
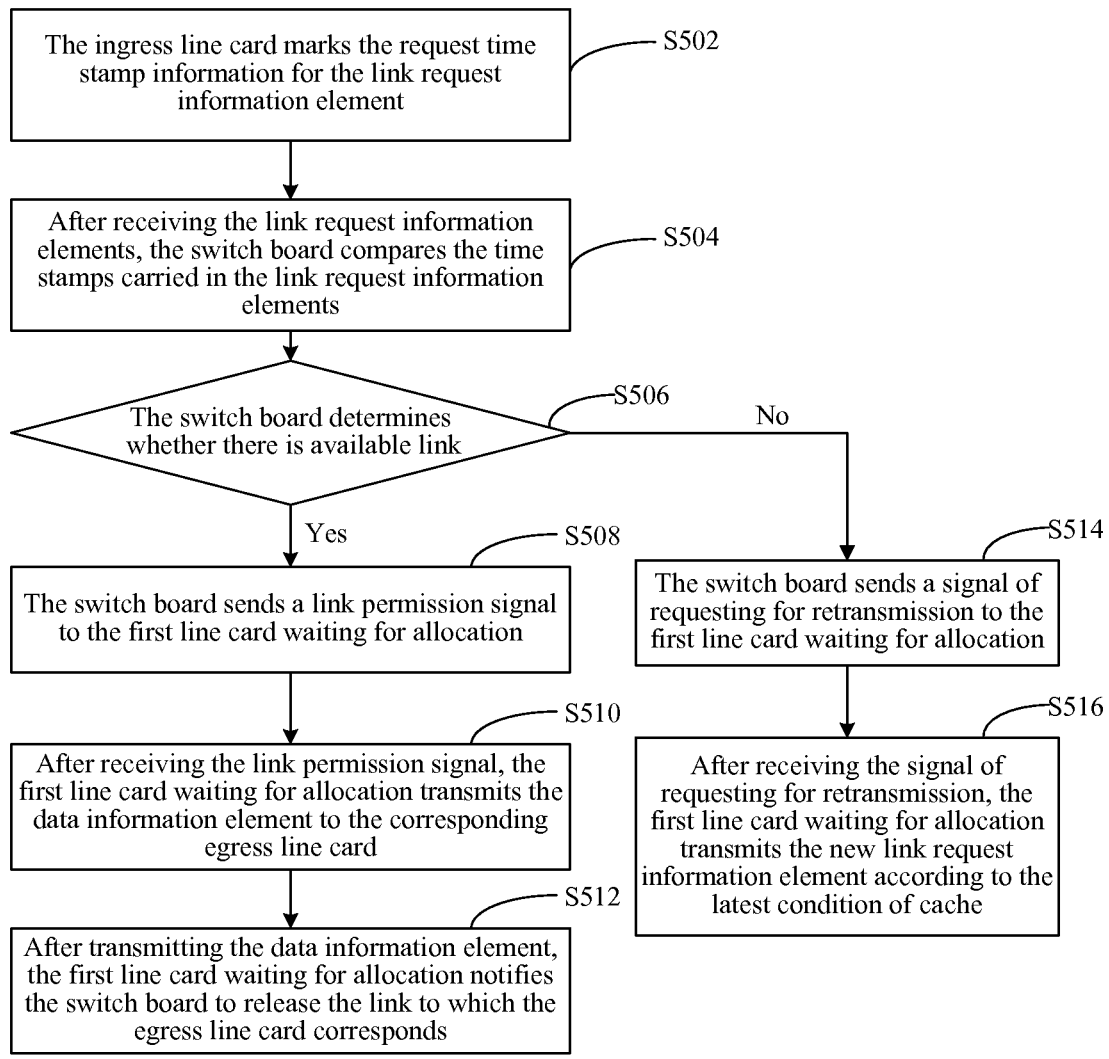
FIG. 5 shows a flowchart of a method for controlling information element switch according to embodiment 2 of the disclosure.
FIG. 6 shows a diagram of information element format of a link request information element according to embodiment 2 of the disclosure.

FIG. 5 shows a flowchart of a method for controlling information element switch according to embodiment of the disclosure. The method comprises the following steps.

Step S502: the ingress line card marks the request time stamp information for the link request information element, wherein the request time stamp information of the embodiment is the current time stamp. The link request information element with marked time stamp is transmitted.

With reference to FIG. 6, the link request information element of the embodiment includes type field (Type), ingress line card identity field (EN_ID), and request field (Request) and time stamp information field (Timestamp) corresponding to each egress line card. The type field is configured to carry the type identity of the current information element. The ingress line card identity field is configured to carry the address information of the ingress line card. The request field is configured to carry the egress line card identity. The time stamp information field is configured to carry the request time stamp information.

If the ingress line card has data to be transmitted to a certain egress line card, the bit of the egress line card in the link request information element is set to be 1, and the bits of other egress line cards are set to be 0.

Figure 1:
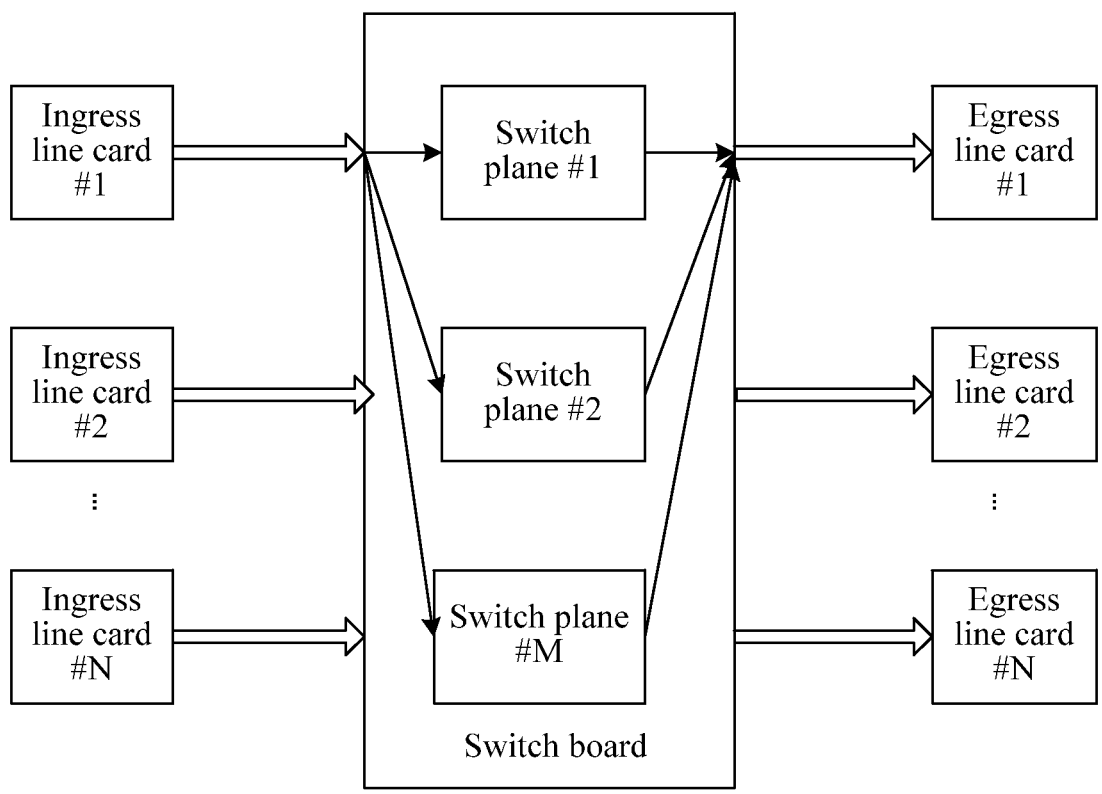
FIG. 1 shows a fundamental structure diagram of a switch network according to the relevant technologies.
Figure 2:
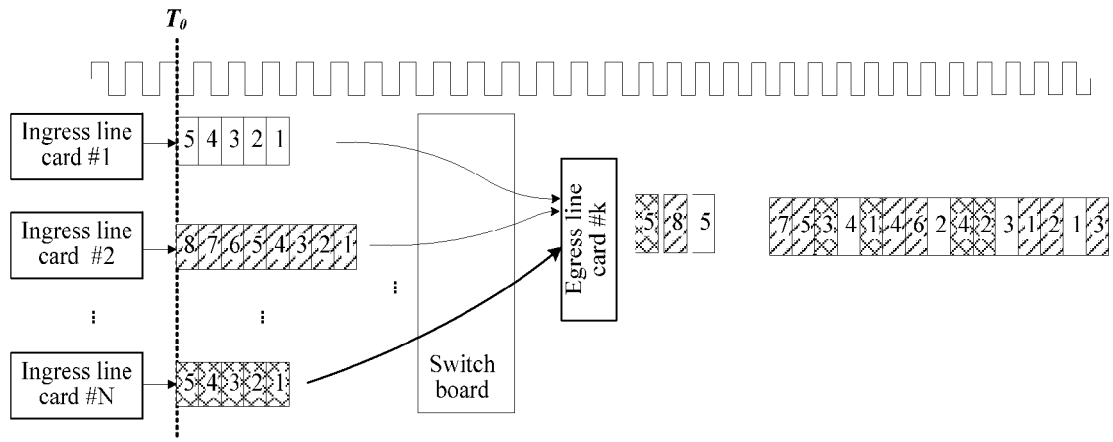
FIG. 2 shows a diagram of performance analysis of information element switch according to the relevant technologies.
Figure 3:
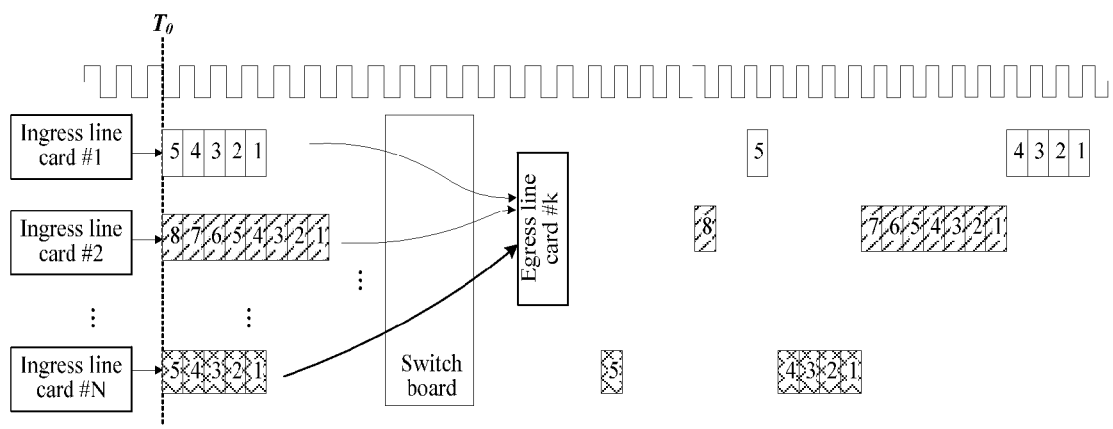
FIG. 3 shows another diagram of performance analysis of information element switch according to the relevant technologies.

As shown in FIG. 1, the switch board is composed of multiple switch planes. For implementing the peak load shifting data packet transmitting mechanism of the whole network, the link allocations of all the switch planes are the same, namely, in the centralized scheduling way. Thus, inputs of these switch planes in the embodiment are the same, which means that the ingress line card needs to transmit the link request information element to all the switch planes.

The link request information element and the data information element are transmitted in the interleaving way, so that it is needed to separate the information elements at the input side of the switch plane. The information elements are separated according to the type field of information header of the information element. If the information element is the link request information element, the request time stamp information in the link request information element is extracted to enter the following comparison of time stamp. If the information element is the data information element, the data information element is forwarded according to the egress line card identity information carried in the data information element.

Step S504: after receiving the link request information elements, the switch board compares the time stamps carried in the link request information elements, and selects the ingress line card which transmitted the minimum time stamp as the first line card waiting for allocation.

Step S506: the switch board determines whether the first line card waiting for allocation has available link; and if yes, executing Step S508; if not, executing Step S514.

A table of egress line card identity is set in the switch board for the egress line cards. Each bit in the table corresponds to one egress line card and is used for identifying whether the egress line card has been allocated. In the embodiment, if the bit is 1, then it means the egress line card is not allocated and is in the idle state. If the bit is 0, then it means the egress line card has been allocated and is in the allocated state. The initial state of all the bits is set to be 1. In addition, a table which is same as the table of egress line card identity is set for storing the intermediate calculation result, and it is called the table of intermediate calculation result.

The table of intermediate calculation result stores: the result of carrying out the bitwise AND operation to the link request field extracted from the information element and the table of egress line card identity. If a bit which is not 0 can be found by querying the table of intermediate calculation result, then it means currently there is available link. If a bit which is not 0 cannot be found in the table of intermediate calculation result, then it means there is no available link to be allocated to the ingress line card. Then, Step S514 and Step S516 are executed, that is, sending a signal of retransmitting the request for link to the ingress line card. After receiving the signal of retransmitting the request for link, the ingress line card generates the new link request information element according to the latest condition of the cache, and requests for the link from the switch board again.

Step S508: the switch board sends a link permission signal to the first line card waiting for allocation.

In the embodiment, the switch board queries the first bit which is not 0 in the table of intermediate calculation result, allocates the link to which the bit corresponds to the ingress line card to which the oldest information element corresponds, namely, the first line card waiting for allocation, and generates the link permission information element to transmit to the corresponding ingress line card.

Figure 7:
FIG. 7 shows a diagram of information element format of a link permission information element according to embodiment 2 of the disclosure.

As shown in FIG. 7, the information element format of the link permission information element of the embodiment includes type field (Type) and permission field (RQ_EX_ID), wherein the permission field is filled with the ID of egress line card to which the link corresponds.

After completing allocation, the switch board sets the corresponding bit in the table of egress line card identity to be 0, and waits for the next comparison of time stamp.

Step S510: after receiving the link permission signal, the first line card waiting for allocation transmits the data information element to the corresponding egress line card.

Step S512: after transmitting the data information element, the first line card waiting for allocation notifies the switch board to release the link to which the egress line card corresponds.

After receiving the link permission information element, the ingress line card transmits the corresponding data information element according to the link allocated by the link permission information element, and sends a signal of releasing link to the switch board after completing transmission of the data information element. After receiving the signal of releasing link, the switch board sets the corresponding bit in the table of egress line card identity to be 1.

Step S514: the switch board sends a signal of requesting for retransmission to the first line card waiting for allocation.

Step S516: after receiving the signal of requesting for retransmission, the first line card waiting for allocation transmits the new link request information element according to the latest condition of cache.

The result after the above flow is illustrated below by an example:

supposing in a 4*4 switch network, 4 links of the switch board are in the idle state. At this point, 4 link request information elements are received. Supposing that all of the 4 link request information elements carry 4 link requests, the time stamps of the link request information elements from No. 1 to No. 4 are respectively 3, 2, 2, 1. Then, after the process of time stamp comparison and link allocation, the switch board allocates the No. 1 link to the No. 4 ingress line card, allocates the No. 2 link to the No. 2 ingress line card, allocates the No. 3 link to the No. 3 ingress line card, and allocates the No. 4 link to the No. 1 ingress line card.

Figure 8:
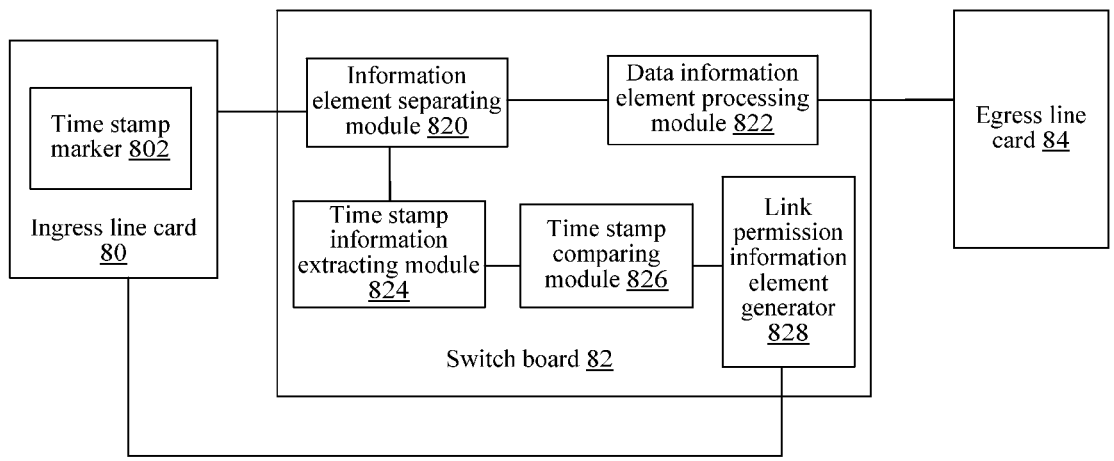
FIG. 8 shows a structure diagram of an apparatus for controlling information element switch according to embodiment 2 of the disclosure.

FIG. 8 shows a structure diagram of an apparatus for controlling information element switch. The apparatus comprises an ingress line card 80, a switch board 82 and an egress line card 84.

All the ingress line cards 80 use the timers with the same time base to mark time stamp for the information element.

The ingress line card 80 comprises a time stamp marker 802. The switch board 82 comprises an information element separating module 820, a data information element processing module 822, a time stamp information extracting module 824, a time stamp comparing module 826 and a link permission information element generator 828.

The implementation process of the method for controlling information element switch is described below by taking the apparatus shown in FIG. 8 for example.

The time stamp marker 802 marks time stamp for the link request information element according to the established rules. When the ingress line card has data to be transmitted, the same link request information element is transmitted to each output interface.

The information element separating module 820 separates the information elements with corresponding types according to the type field of the information element header, and transmits the information elements to different processing modules. If the information element is the link request information element, then the information element is transmitted to the time stamp information extracting module 824. If the information element is the data information element, then the information element is transmitted to the data information element processing module 822 for processing.

The time stamp information extracting module 824 extracts the time stamp information of the link request information element for the comparison of time stamp by the time stamp comparing module 826.

The time stamp comparing module 826 compares the time stamp information extracted by the time stamp information extracting module 824, and sends the comparison result to the link permission information element generator 828 to perform link allocation.

After each time stamp information extracting module 824 extracts the time stamp information, then the time stamp comparing module 826 of the embodiment starts comparing time stamps. In the embodiment, when each information element leaves the ingress line card 80, all of the information elements include the address information of the ingress line card, wherein the address information is used for differentiating the information elements with the same time stamp.

When the time stamps are different by comparing, the information element with the oldest time stamp is transmitted to the next module for processing. When the time stamps are the same by comparing, the addresses of the ingress line cards are compared, and the information element with the minimum or the maximum address of the ingress line card is transmitted to the link permission information element generator 828 for processing.

The link permission information element generator 828 performs link allocation according to the result of time stamp comparing module 826 and the current condition of link occupation.

A table of egress line card identity is set in the link permission information element generator 828 for the egress line card. Each bit in the table corresponds to one egress line card and is used for identifying whether the egress line card has been allocated. If the bit is 1, then it means the egress line card is not allocated and is in the idle state. If the bit is 0, then it means the egress line card has been allocated. The initial state of all the bits is set to be 1. In addition, a table which is same as the table of egress line card identity is set for storing the intermediate calculation result, and it is called the table of intermediate calculation result.

The link permission information element generator 828 extracts the link request field of the information element, and carries out the bitwise AND operation on the link request field and the table of egress line card identity, and stores the result of calculation in the table of intermediate calculation result.

The link permission information element generator 828 queries the first bit which is not 0 in the table of intermediate calculation result, allocates the link to which the bit corresponds to the ingress line card to which the oldest information element corresponds, generates the link permission information element by filling the permission field (RQ_EX_ID) with the ID of the egress line card to which the link corresponds to. and transmits the link permission information element to the corresponding ingress line card. Then, The link permission information element generator 828 sets the corresponding bit in the table of egress line card identity to be 0, and waits for the next comparison of time stamp. If the bit which is not 0 is not found in the table of intermediate calculation result, it means there is no available link to be allocated to the ingress line card. Then, a signal of retransmitting the request for link is sent to the ingress line card. After receiving the signal of retransmitting the request for link, the ingress line card 80 generates the new link request information element according to the latest condition of cache, and requests for the link from the switch board again.

After receiving the link permission information element, the ingress line card 80 transmits the corresponding data information element according to the link allocated by the link permission information element, and sends a signal of releasing link to the switch board 82 after completing transmission of the data information element. After receiving the signal of releasing link, the switch board sets the corresponding bit in the table of egress line card identity to be 1.

Figure 9:
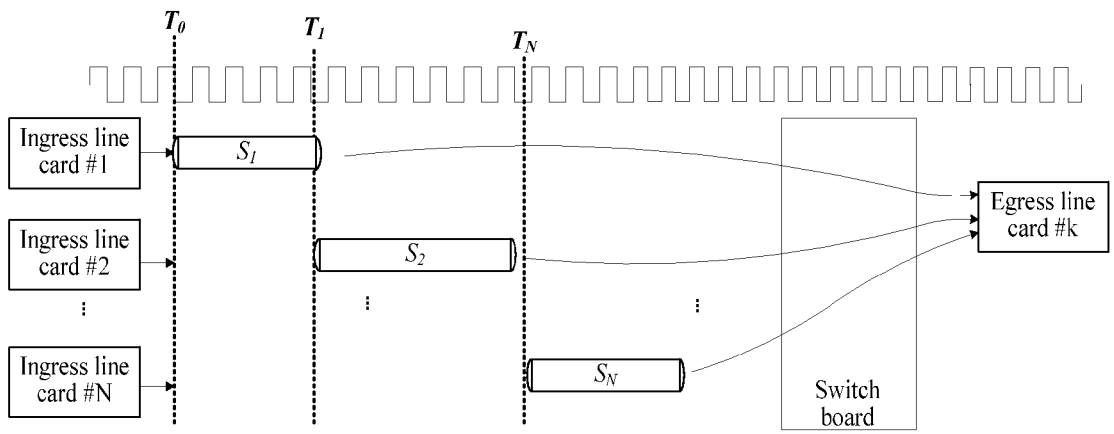
FIG. 9 shows a diagram of off-peak data packet transmitting mechanism according to embodiment 2 of the disclosure.

The embodiment adopts the time stamp technology to control the flow from the ingress line card to the switch board, that is, controlling the input end of the switch board. This solution allocates the available link to the ingress line card with the oldest time stamp, so as to avoid the situation that multiple ingress line cards transmit data to one egress line card at the same time. The data packets of the same egress line card enter the switch card one by one, that is, providing the peak load shifting data packet transmitting mechanism as shown in FIG. 9. Therefore, the caches of the egress line card and the switch board will not increase instantaneously, which fundamentally overcomes the major disadvantages of time delay and jitter in the information element switch process.

The embodiment adopts the time stamp information to perform link allocation, and can control the flow of the input end of the switch board with relatively low consumption of hardware resource. This solution realizes the peak load shifting data packet transmitting mechanism, and solves the problems of difficulty in data packet recombination, time delay and jitter.

Embodiment 3

Figure 10:
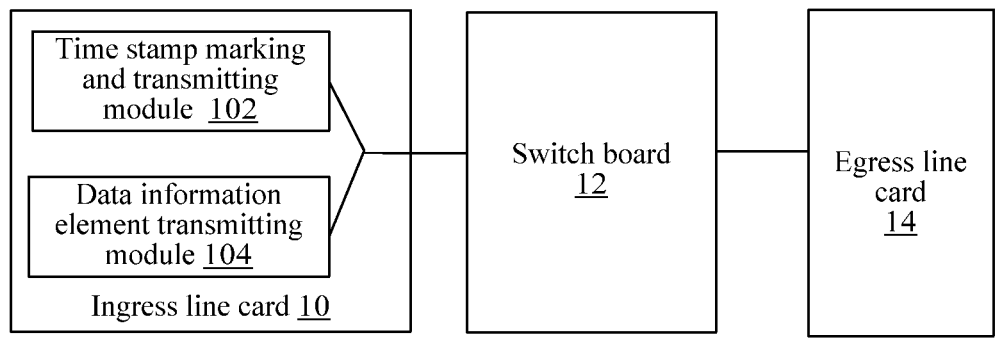
FIG. 10 shows a structure diagram of an apparatus for controlling information element switch according to embodiment 3 of the disclosure.

FIG. 10 shows a structure diagram of an apparatus for controlling information element switch according to embodiment of the disclosure. The apparatus comprises an ingress line card 10, a switch board 12 and an egress line card 14.

There can be a plurality of ingress line cards 10 and a plurality of egress line cards 14. The ingress line card 10 of the embodiment comprises:

a time stamp marking and transmitting module 102, configured to transmit the link request information element to the switch board 12, wherein the link request information element carries the request time stamp information;

a data information element transmitting module 104, configured to transmit the data information element according to the result of the link allocation of the switch board 12; and the switch board 12, connected to the ingress line card 10 and configured to receive the link request information element from each ingress line card 10 and perform link allocation according to each request time stamp information, wherein the link is a link connecting the switch board 12 with each egress line card 14.

The link request information element of the embodiment can be realized by adopting the format shown in FIG. 6. Relevant description is not repeated here.

Figure 11:
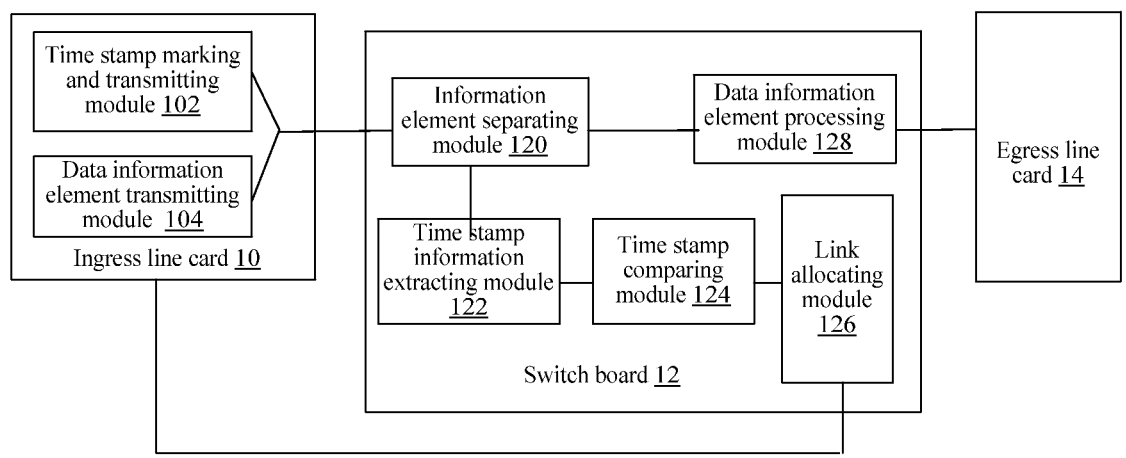
FIG. 11 shows a specific structure diagram of an apparatus for controlling information element switch according to embodiment 3 of the disclosure.

FIG. 11 shows a specific structure diagram of an apparatus for controlling information element switch according to embodiment of the disclosure. The switch board 12 comprises:

a time stamp information extracting module 122, configured to extract the request time stamp information from each received link request information element;

a time stamp comparing module 124, connected to the time stamp information extracting module 122 and configured to compare the size of the request time stamp information extracted by the time stamp information extracting module 122, and to select the ingress line card with the minimum request time stamp information as the first line card waiting for allocation; and a link allocating module 126, connected to the time stamp comparing module 124 and configured to determine whether the egress line card to which the egress line card identity corresponds is in the idle state according to the egress line card identity carried in the link request information element of the first line card waiting for allocation, and if yes, allocate the link to which the egress line card identity corresponds to the first line card waiting for allocation.

Considering that there may be multiple ingress line cards transmitting the link request information elements to the switch board at the same time, the request time stamp information carried by the multiple ingress line cards will be the same. For handling the situation, the time stamp comparing module 124 of the embodiment can further comprise:

a line card selecting unit, configured to, when multiple request time stamp information values of the each ingress line card are the same, and the multiple request time stamp information values are less than other request time stamp information except themselves, select one ingress line card from the ingress line cards to which the multiple request time stamp information values correspond as the first line card waiting for allocation, according to the address information of the ingress line card carried in the link request information element. For example, an ingress line card with the minimum address can be selected from the multiple ingress line cards with the same request time stamp information as the first line card waiting for allocation. Or, an ingress line card with the maximum address can be selected from the multiple ingress line cards with the same request time stamp information as the first line card waiting for allocation.

In practical implementation, the ingress line card can transmit the data information element as well as the link request information element. Therefore, the switch board 12 needs to separate these information elements for respective processing, according to the specific types of the information elements. Thus, the switch board 12 of the embodiment can further comprise:

an information element separating module 120, configured to, after receiving the information element carrying the type identity, determine that the received information element is the link request information element according to the type identity, and transmit the link request information element to the time stamp information extracting module 122; or determine that the received information element is the data information element according to the type identity, and transmit the data information element to a data information element processing module 128; and the data information element processing module 128, configured to forward the data information element to the corresponding egress line card 14.

The switch board 12 of the embodiment changes the state of the egress line card of the allocated link to the allocated state, after performing link allocation according to each request time stamp information. Each egress line card 10 notifies the switch board 12 to release the corresponding link, after transmitting the data information element according to the result of the link allocation. The switch board 12 changes the state of the egress line card of the corresponding link to the idle state, after receiving the notification.

The switch board of the embodiment performs link allocation according to each request time stamp information, and each ingress line card transmits the data information element according to the result of the link allocation. This solution can implement centralized scheduling to the distributed switch network, thereby solving the problems of time delay and jitter in the information element switch process, controlling the flow of the input end of the switch board, and reducing the requirement for the egress line card cache and the difficulty in data packet recombination.

It can be seen from the description above that the disclosure achieves the following technical effects: the above embodiments adopt the time stamp technology to control the flow of the input end of the switch board, thereby realizing switch. This solution solves the problems of switch delay, jitter and the difficulty in data packet recombination with relatively low consumption of hardware resource. For example, the centralized scheduling to the distributed switch network is implemented through the comparison of time stamp. The flow of the input end of the switch board is controlled by performing link allocation through the time stamp information. The needed cache capacity of the egress line card is substantially reduced, and the difficulty in data packet recombination is reduced.

Obviously, the skilled personnel in the field should appreciate that above-mentioned modules and steps of the disclosure can be realized by a general-purpose computing device, and they can be centralized in a single computing device or distributed on a network composed of multiple computing devices. Optionally, they can be realized by program code which is capable of being executed by the computing device, so that they can be stored in a storage device and executed by the computing device. In addition, under some conditions, the presented or described steps can be executed in an order different from that described here; or they are made into integrated circuit modules, respectively; or multiple modules and steps of them are made into a single integrated circuit module to realize. In this way, the disclosure is not limited to any particular combination of hardware and software.

The above is only the preferred embodiments of the disclosure and is not intended to limit the disclosure. For the skilled personnel in the field, the disclosure may have various modifications and changes. Any modifications, equivalent replacements, improvements and the like within the principle of the disclosure shall fall within the scope of the claims of the disclosure.

What is claimed is:

1. A method for controlling information element switch, comprising:
    determining, via a switch board, that a link request information element from each of at least one ingress line card is received, wherein each link request information element carries request time stamp information, an egress line card identity and address information of corresponding ingress line card that transmits the link request information element;
    performing, via the switch board, a link allocation according to each request time stamp information, wherein the link to be allocated is a link connecting the switch board with each egress line card, and wherein the switch board is configured to allocate the available link to the ingress line card that applied for a link early based on the request time stamp information; and wherein the step of performing, via the switch board, a link allocation comprises:

extracting, via the switch board, the request time stamp information from each link request information element, comparing a size of the each request time stamp information, and selecting an ingress line card with minimum request time stamp information as a first line card waiting for allocation, selecting one ingress line card as the first line card waiting for allocation from ingress line cards to which the multiple values correspond, according to the address information of the ingress line card, when multiple values of the each request time stamp information are the same, and the multiple values are less than other request time stamp information except the multiple values, and determining, via the switch board, whether an egress line card to which the egress line card identity corresponds is in an idle state, and if yes, allocating a link to which the egress line card identity corresponds to the first line card waiting for allocation; and transmitting, via each ingress line card, a data information element according to a result of the link allocation.

2. The method according to claim 1, wherein after determining, via the switch board, whether the egress line card to which the egress line card identity corresponds is in the idle state, the method further comprises: if a result of determining by the switch board is no, determining that the egress line card to which the egress line card identity corresponds is in an allocated state, and notifying, via the switch board, the first line card waiting for allocation to re-request for link.

3. The method according to claim 1, wherein both the link request information element and the data information element carry a type identity; and before the switch board determining that the link request information element from the each ingress line card is received, the method further comprises: the switch board determining the type of the received information element according to the type identity; and if the information element is the data information element, the switch board forwarding the data information element to corresponding egress line card.

4. The method according to claim 1, wherein after the switch board performing the link allocation according to the each request time stamp information, the method further comprises: changing the state of the egress line card of the allocated link to an allocated state; and after the each ingress line card transmitting the data information element according to the result of the link allocation, the method further comprises:

notifying the switch board to release a corresponding link; and after receiving the notification, the switch board changing the state of the egress line card of the corresponding link to an idle state.

5. The method according to claim 1, wherein after determining, via the switch board, whether the egress line card to which the egress line card identity corresponds is in the idle state, the method further comprises: if a result of determining by the switch board is no, determining that the egress line card to which the egress line card identity corresponds is in an allocated state, and notifying, via the switch board, the first line card waiting for allocation to re-request for link.

6. An apparatus for controlling information element switch, comprising an ingress line card, a switch board and an egress line card, wherein the ingress line card comprises:

a time stamp marking and transmitting module configured to transmit a link request information element to the switch board, wherein the link request information element carries request time stamp information;

a data information element transmitting module configured to transmit a data information element according to a result of link allocation of the switch board; and the switch board configured to receive the link request information element from each of at least one ingress line card and to perform the link allocation according to each request time stamp information, wherein the link is a link connecting the switch board with each of at least one egress line card, and wherein the switch board is configured to allocate the available link to the ingress line card which applied for a link early based on the request time stamp information, and wherein the switch board comprises:

a time stamp information extracting module, configured to extract the request time stamp information from each received link request information element;

a time stamp comparing module, configured to compare size of each request time stamp information extracted by the time stamp information extracting module, and to select an ingress line card with minimum request time stamp information as a first line card waiting for allocation, wherein the time stamp comparing module further comprises: a line card selecting unit, configured to, when multiple values in the request time stamp information of the each ingress line card are the same, and the multiple values are less than other request time stamp information except the multiple values, select one ingress line card as the first line card waiting for allocation from ingress line cards to which the multiple request time stamp information values correspond according to address information of the ingress line card carried in the link request information element; and a link allocating module, configured to determine whether an egress line card to which an egress line card identity corresponds is in an idle state according to the egress line card identity carried in the link request information element of the first line card waiting for allocation, and if yes, to allocate a link to which the egress line card identity corresponds to the first line card waiting for allocation.

7. The apparatus according to claim 6, wherein the switch board further comprises:

an information element separating module, configured to, after receiving an information element carrying a type identity, if it is determined that the received information element is the link request information element according to the type identity, transmit the link request information element to the time stamp information extracting module, and if it is determined that the received information element is the data information element according to the type identity, transmit the data information element to a data information element processing module; and the data information element processing module, configured to forward the data information element to corresponding egress line card.

* * * * *